United States Patent [19]

Takagi et al.

[11] Patent Number: 5,651,094

[45] Date of Patent: Jul. 22, 1997

[54] ACOUSTIC CATEGORY MEAN VALUE CALCULATING APPARATUS AND ADAPTATION APPARATUS

[75] Inventors: Keizaburo Takagi; Hiroaki Hattori, both of Tokyo, Japan

[73] Assignee: NEC Corporation, Tokyo, Japan

[21] Appl. No.: 463,289

[22] Filed: Jun. 5, 1995

[30] Foreign Application Priority Data

Jun. 7, 1994 [JP] Japan .................................. 6-125528

[51] Int. Cl.⁶ .................................................. G01L 5/00
[52] U.S. Cl. .................... 395/2.53; 395/2.4; 395/2.45; 395/2.47
[58] Field of Search ...................... 395/2.47, 2.4, 395/2.42, 2.45, 2.46, 2.48, 2.49, 2.5, 2.59, 2.64, 2.65, 2.53

[56] References Cited

U.S. PATENT DOCUMENTS

| | | | |
|---|---|---|---|
| 4,530,110 | 7/1985 | Nojiri et al. | 395/2.48 |
| 4,559,604 | 12/1985 | Ichikawa et al. | 395/2.45 |
| 4,720,802 | 1/1988 | Damoulakis et al. | 395/2.42 |
| 4,783,802 | 11/1988 | Takebayashi et al. | 395/2.52 |
| 5,159,637 | 10/1992 | Okazaki et al. | 395/2.47 |
| 5,274,737 | 12/1993 | Shinoda | 395/2.54 |
| 5,315,689 | 5/1994 | Kanazawa et al. | 395/2.47 |

OTHER PUBLICATIONS

K. Shinoda et al., "Speaker Adaption Using Spectral Interpolation for Speech Recognition", Treatises A of Electronics, Information and Communication Engineers, vol. J77–A No. 2, pp. 120–127, Feb., 1994.

Takagi et al., "Speech Recognition with Environment Adaption by Spectrum Equaliztion", Collected Lecture Papers of Spring Meeting of the Acoustical Society of Japan, p. 173–174, Mar., 1994.

Shinoda et al; "Speaker Adaptation for demi–syllable based continous density HMM"; ICASSP 1991 pp. 857–860 Jul. 1991.

Takagi et al; "Rapid Environment adaptation for Robust Speech Recognition"; ICASSP May 1995; pp. 149–152 May 1995.

*Primary Examiner*—Ayaz R. Sheikh
*Assistant Examiner*—Michael Opsasnick
*Attorney, Agent, or Firm*—Foley & Lardner

[57] ABSTRACT

Each time a matching unit 22 finishes a matching at a time "i" between feature vectors of input speech which have been converted by an analyzer 1 and feature vectors of reference patterns stored in a reference pattern memory 2, and goes to a matching at a next time "i+1", a feature vector integrator 24 multiplies the feature vectors of the input speech or the reference patterns by a weight w1 in each of acoustic categories, successively integrates products, stores integrated values in respective frames of the reference patterns in feature vector accumulating buffers 26, and integrates and stores weights w1 in feature vector weight counters 27 corresponding to the respective acoustic categories. When the feature vector integrator 24 finishes integrating and storing processes corresponding to the final matching process, a mean value calculator 28 divides the values stored in the final frames in the feature vector accumulating buffers 26 by the values stored in the feature vector weight counters 27, and outputs the quotients as mean values in the respective acoustic categories of the input speech or the reference patterns. An adaptation unit 55 adapts one or both of the input speech or the reference patterns using the mean values.

7 Claims, 4 Drawing Sheets

ACOUSTIC CATEGORY MEAN VALUE CALCULATING APPARATUS AND ADAPTATION APPARATUS

BACKGROUND OF THE INVENTION

1. Field of the Invention

The present invention relates generally to speech recognition, and more particularly to an improvement in the technique of calculating the mean value of each acoustic category that is necessary to effect speaker adaptation of input speech or reference patterns.

2. Description of the Related Art

Various different speech recognition techniques have been known depending on the nature and level of technology. The basic principles behind the existing speech recognition techniques are as follows: Utterances to be recognized are analyzed in a training or registering mode, and stored as reference patterns. An unknown utterance that is uttered by a speaker is analyzed in a recognition or testing mode, and the pattern produced as a result of the analysis is compared successively with the reference patterns. Then, a result that corresponds to one of the reference patterns which best matches the pattern is outputted as the recognized utterance.

Among various speech recognition systems, a speaker-independent speech recognition system is widely used, in which utterances of many speakers are registered as reference patterns to accommodate the distribution of the speaker individualities. Therefore, the speaker-independent speech recognition system is capable of recognizing utterances of an unknown speaker at a relatively high speech recognition rate regardless of speech sound variations in different speakers.

However, the speaker-independent speech recognition system is disadvantageous in that it cannot achieve a high performance if unknown utterances that are inputted are largely different from those registered as reference patterns. It is also known that the speech recognition rate of the system is degraded if a microphone used to record testing utterance is different from the microphones that were used to record utterances to provide reference patterns.

A technique which is known as "speaker adaptation" to improve the speech recognition rate has been proposed. The speaker adaptation process employs relatively few utterances provided by a specific speaker or a specific microphone to adapt reference patterns to the utterances. One example of the speaker adaptation method is disclosed by K. Shinoda et al. "Speaker Adaptation on Using Spectral Interpolation for Speech Recognition", Trans. of IEICE (Jap.), vol. J 77-A, No. pp. 120–127, February 1994 (hereinafter referred to as "literature 1").

A conventional speech recognition system used for speaker adaptation will be described below with reference to FIG. 1 of the accompanying drawings.

Figure 1:
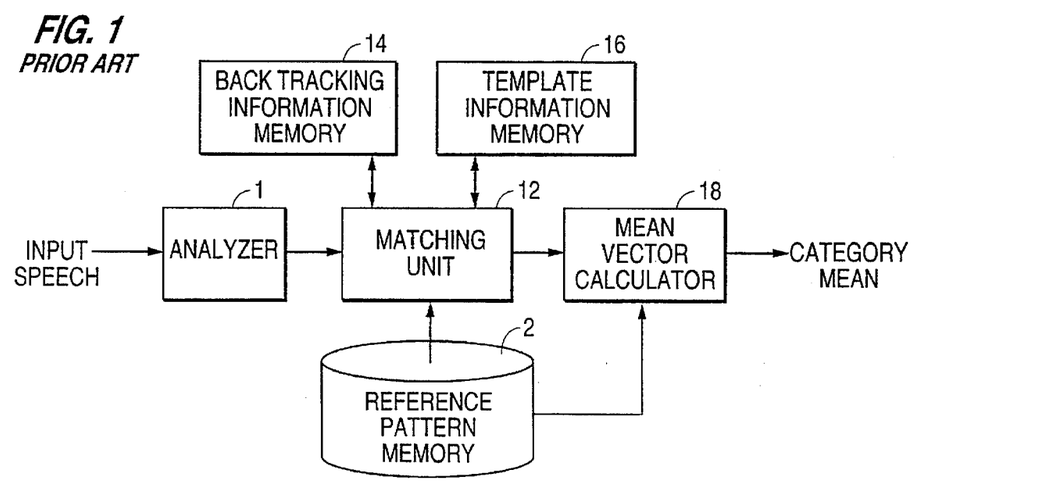
FIG. 1 is a block diagram of a conventional acoustic category mean value calculating apparatus.

As shown in FIG. 1, the conventional speech recognition system comprises an analyzer 1 for converting input speech into a time sequence of feature vectors, a reference pattern memory 2 for storing reference patterns, i.e., a time sequence of feature vectors that have been converted from training utterances and contain weighting information for each acoustic category, a matching unit 12 for comparing the time sequence of feature vectors of input utterances and the reference patterns to determine an optimum path and a time-alignment between the input utterances and the reference patterns, a backtracking information memory 14 for storing two-dimensional information associated by the matching unit 12, a template information memory 16 for storing template information, i.e., the index information of a template that indicates which template has been used at respective grid points if the template is a multiple template having a plurality of reference patterns, and a mean vector calculator 18 for carrying out a backtracking process to determine which reference pattern is associated with the input speech at each time, based on the two-dimensional associated information stored in the backtracking information memory 14. Both the backtracking information memory 14 and the template information memory 16 have a two-dimensional storage area having a size of (length of input speech)×(length of reference pattern).

The analyzer 1 may convert input speech into a time sequence of feature vectors according to any of various spectral analysis processes. These various spectral analysis processes include a method of employing output signals from a band-pass filter bank in 10 through 30 channels, a nonparametric spectral analysis method, a linear prediction coding (LPC) method, and a method of obtaining various multidimensional vectors representing short-time spectrums of input speech with various parameters including a spectrum directly calculated from a waveform by Fast Fourier Transform (FFT), a cepstrum which is an inverse Fourier transform of the logarithm of a short-time amplitude spectrum of a waveform, an autocorrelation function, and a spectral envelope produced by LPC.

Generally, feature vectors that are extracted as representing speech features from input speech using discrete times as a frame include power information, a change in power information, a cepstrum, and a linear regression coefficient of a cepstrum. Spectrums themselves and logarithmic spectrums are also used as feature vectors.

Speech of a standard speaker is analyzed and converted into a time sequence of feature vectors in the same manner as the analysis process employed by the analyzer 1, and the feature vectors are registered as reference patterns in units of isolated words, connected words, or phonemes in the reference pattern memory 2. Weighting information for respective categories to be classified is established in advance with respect to these reference patterns.

The matching unit 12 carries out a matching of dynamic time warping between the time sequence of the feature vectors of the input speech converted by the analyzer 1 and the reference patterns stored in the reference pattern memory 2. The matching algorithm between the two patterns is preferably one of the algorithms which take into account nonlinear expansion and contraction in the time domain because the time sequence of the input speech and the reference patterns are easily expanded and contracted in the time domain. The algorithms which take into account nonlinear expansion and contraction in the time domain include a DP (Dynamic Programming) matching method, a HMM (Hidden Markov Model) matching method, and so on. In the description given below, the DP matching which is widely used in the art of present speech recognition will be explained.

If it is assumed that symbols "i", "j" represent time frames (i=0 to I), (j=0 to J) of a respective input speech and a reference pattern, and the symbol "c" represents a vector component, then the time sequence of the feature vectors of input speech are indicated by X(i, c), and the time sequence of the reference pattern are indicated by Y(j, c).

The input speech and the reference patterns make up a two-dimensional space composed of grid points (i, j), and a minimum path of accumulated distances, among paths from a starting end (0, 0) to a terminal end (I, J), is regarded as an optimum association between the two patterns, and the accumulated distances are referred to as the distance between the patterns. According to speech recognition based on the DP matching, distances between the input speech and all the reference patterns are calculated, and the acoustic category of one of the reference patterns which gives a minimum distance is outputted as the result of speech recognition.

If the DP matching is carried out for adaptation or learning, then since a reference pattern and the speech to be compared are already limited, the DP matching has its object to determine a mean value of feature vectors in each acoustic category when an optimum time-alignment is obtained between two patterns, rather than speech recognition.

Distances $d(i, j)$ between the vectors of the grid points $(i, j)$ of the time sequence $X(i, c)$ of the feature vectors of the input speech and the time sequence $Y(j, c)$ of the feature vectors of the reference patterns are defined as follows:

$$d(i,j) = \min_{k} \left[ \sum_{c=1}^{C} |X(i,c) - Y^{(k)}(j,c)|^2 \right]$$

where k represents a kth template at respective grid point. A distance for each grid point corresponds to the minimum one of the distances given by plural ks templates.

According to the DP matching, the accumulated distances $D(i, j)$ associated with the grid points $(i, j)$ are indicated by the following recursive equation:

$$D(i,j) = d(i,j) + \min \begin{vmatrix} D(i,j) \\ D(i,j-1) \\ D(i,j-2) \end{vmatrix}$$

Specifically, accumulated distances D are calculated in a direction for the input speech to increase in time, using the grid point (0, 0) as a starting point and the initial value $D(0, 0)$ as $d(0, 0)$, and when accumulated distances up to the final grid point (I, J) are determined, an optimum matching path between the two patterns is considered to be determined.

The backtracking information that is stored in the backtracking information memory 5 is transition information $B(i, j)$ of the respective grid points which is expressed as follows:

$$B(i,j) = \text{argmin}_{(j)} \begin{vmatrix} D(i,j) \\ D(i,j-1) \\ D(i,j-2) \end{vmatrix}$$

where $\text{argmin}_{(j)}$ represents the selection of any one of the values j, j−1, j−2 which gives D a minimum value, as the value of a j component.

The template information $T(i, j)$ which is stored in the template information memory 16 is represented by:

$$T(i,j) = \text{argmin}_{(k)} \left[ \sum_{c=1}^{C} |X(i,c) - Y^{(k)}(j,c)|^2 \right]$$

The backtracking process that has heretofore been carried out by the conventional mean vector calculator 18 will be described below with respect to a simple example where the number of acoustic categories to be classified is 2, i.e., input speech is divided into a noise portion and a speech portion, and their mean values are determined.

If the mean values of noise and speech portions are indicated respectively by N(c), S(c), then the mean values in the respective acoustic categories back along the optimum path from a grid point (I, J) to a grid point (0, 0) are calculated as follows:

In a first step, the values of i, j, N(c), S(c) are set respectively to I, J, 0, 0 as follows:
i=I,
j=J,
N(c)=0, and
S(c)=0.

In a second step, the type of the acoustic category of the grid point (i, j) is checked. If it is a speech category, then S(c)=S(c)+X(i, c) is calculated, and if it is a noise category, then N(c)=N(c)+X(I, c) is calculated.

In a third step, the values of i and j are checked. If both are 0, then the processing jumps to a fifth step, and if i or j is not 0, then the processing proceeds to a fourth step.

In the fourth step, i is decremented by 1, and the transition information B(i, j) of the grid point (i, j) is put in j as follows:
i=i−1, and
j=B(i, j).

Thereafter, the processing returns to the second step, and the second and following steps are repeated.

In the fifth step, the contents of N(c), S(c) are divided by the number of times which are respectively summed up, and the mean values in the respective acoustic categories are calculated. The processing is now completed.

In the conventional acoustic category mean value calculating apparatus, the backtracking process is carried out by going from a grid point position composed of a terminal end point of input speech and a terminal end point of a reference pattern back toward a starting end to associate the input speech and the reference pattern in a two-dimensional space. Mean vectors of the input speech are calculated in respective categories of the reference pattern that has been associated by the backtracking process, and outputted as acoustic category mean values.

Since the conventional acoustic category mean value calculating apparatus is required to search in the two-dimensional space in both the matching process that is executed by the matching unit 12 and the backtracking process that is executed by the mean vector calculator 18, the conventional acoustic category mean value calculating apparatus has been disadvantageous in that it needs a large amount of calculations and hence is not suitable for real-time operation. Furthermore, inasmuch as the backtracking process that is executed by the mean vector calculator 18 cannot be started unless the matching process that is executed by the matching unit 12 is finished, the backtracking process and the matching process cannot be executed simultaneously parallel to each other, i.e., they cannot be executed by way of so-called pipeline processing. This also makes the conventional acoustic category mean value calculating apparatus incapable of real-time operation.

Even if the number of acoustic categories to be classified is small, the conventional acoustic category mean value calculating apparatus necessarily needs a large memory as a two-dimensional storage area for carrying out the backtracking process. For this reason, it has been impossible to make the conventional acoustic category mean value calculating apparatus inexpensive.

SUMMARY OF THE INVENTION

It is therefore an object of the present invention to provide an acoustic category mean value calculating apparatus and an adaptation apparatus which require a reduced memory size for adaptation of input speech or reference patterns, and operate efficiently without need for a backtracking process.

According to the present invention, there is provided an apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain weighting information for each acoustic category, to effect a time-alignment in each frame, for thereby calculating a mean value in each of the acoustic categories, the apparatus comprising as many feature vector accumulating buffers as the number of acoustic categories in each frame of the reference patterns, for storing an accumulated value of weighted feature vectors in the acoustic categories, as many weight counters as the number of acoustic categories in each frame of the reference patterns, for storing an accumulated value of weights of feature vectors added in the acoustic categories in each frame, a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters, and a mean value calculator for dividing accumulated values of weighted feature vectors in final frames of the matching in the respective acoustic categories stored in the feature vector accumulating buffers by the accumulated values of weights in the acoustic categories stored in the weight counters, and outputting the quotients as mean values in the acoustic categories of the feature vectors of the input speech to be calculated.

According to the present invention, there is also provided an apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain weighting information for each acoustic category, to effect a time-alignment in each frame, for thereby calculating a mean value in each of the acoustic categories, the apparatus comprising two acoustic category mean value calculating sections each comprising as many feature vector accumulating buffers as the number of acoustic categories in each frame of the reference patterns, for storing an accumulated value of weighted feature vectors in the acoustic categories, as many weight counters as the number of acoustic categories in each frame of the reference patterns, for storing an accumulated value of weights of feature vectors added in the acoustic categories in each frame, a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters, and a mean value calculator for dividing accumulated values of weighted feature vectors in final frames of the matching in the respective acoustic categories stored in the feature vector accumulating buffers by the accumulated values of weights in the acoustic categories stored in the weight counters, and outputting the quotients as mean values in the acoustic categories of the feature vectors of the input speech to be calculated.

According to the present invention, there is also provided an apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain added weighting information for each acoustic category, to effect a time-alignment in each frame, for thereby calculating a mean value in each of the acoustic categories, and for adapting at least one of the input speech and the reference patterns using the mean value in each of the acoustic categories, the apparatus comprising two acoustic category mean value calculating sections each comprising as many feature vector accumulating buffers as the number of acoustic categories in each frame of the reference patterns, for storing an accumulated value of weighted feature vectors in the acoustic categories, as many weight counters as the number of acoustic categories in each frame of the reference patterns, for storing an accumulated value of weights of feature vectors added in the acoustic categories in each frame, a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters, and a mean value calculator for dividing accumulated values of weighted feature vectors in final frames of the matching in the respective acoustic categories stored in the feature vector accumulating buffers by the accumulated values of weights in the acoustic categories stored in the weight counters, and outputting the quotients as mean values in the acoustic categories of the feature vectors of the input speech to be calculated.

According to the present invention, there is also provided a method of calculating a mean value in each acoustic category by matching a time sequence of feature vectors which have been converted from input speech and reference patterns composed of a time sequence of feature vectors that have been converted from training speech sounds and containing added weighting information for each acoustic category, to effect a time-alignment in each frame, for thereby calculating a mean value in each of the acoustic categories, the method comprising the steps of, each time the input speech is matched with the reference patterns successively from a first frame of the reference patterns and a transition is made to a next frame, integrating values which have been produced by multiplying the feature vectors of the input speech to be calculated in the frame in which the input speech is matched with the reference patterns, by the weight in each of the acoustic categories in the frame, and holding the integrated values in each frame, integrating weights in the respective acoustic categories in the frame in which the input speech is matched with the reference patterns, and holding the integrated weights in each frame, after the input speech is matched with the reference patterns in a final frame, dividing a weighted accumulated value of the feature vectors in each of the acoustic categories in the final frame, by a weighted accumulated value of weights in the corresponding acoustic categories in the frame, and outputting a quotient as a mean value in each of the acoustic categories.

In the above method, an accumulation of weighted feature vectors in each of the acoustic categories with respect to the feature vectors extracted from the input speech, and an accumulated value of weights thereof may be calculated to output a mean value in each of the acoustic categories of the feature vectors of the input speech.

In the above method, an accumulation of weighted feature vectors in each of the acoustic categories with respect to the feature vectors of the reference patterns, and an accumulated value of weights thereof may be calculated to output a mean value in each of the acoustic categories of the feature vectors of the reference patterns.

In the above method, an accumulation of weighted feature vectors in each of the acoustic categories with respect to the feature vectors extracted from the input speech and the feature vectors of the reference patterns, and an accumulated value of weights thereof may be calculated to output mean values in each of the acoustic categories of the feature vectors of the input speech and the reference patterns simultaneously with each other.

An adaptation apparatus according to the present invention has an adaptation unit for adapting at least one of input speech and reference patterns using mean values in the respective acoustic categories which are calculated by the apparatus for calculating a mean value in each acoustic category according to the present invention.

Because a mean value in each acoustic category is calculated by the apparatus at the time of completion of the matching process, the calculation process may be carried out in one stage, and hence may require a reduced memory size and operate at a high speed. Since the apparatus is capable of simultaneously effecting the matching process and the mean vector integrating process, the apparatus is able to effect parallel calculations by way of pipeline processing and hence carry out real-time processing.

The above and other objects, features, and advantages of the present invention will become apparent from the following description referring to the accompanying drawings which illustrate an example of preferred embodiments of the present invention.

DETAILED DESCRIPTION OF THE PREFERRED EMBODIMENTS

Figure 2:
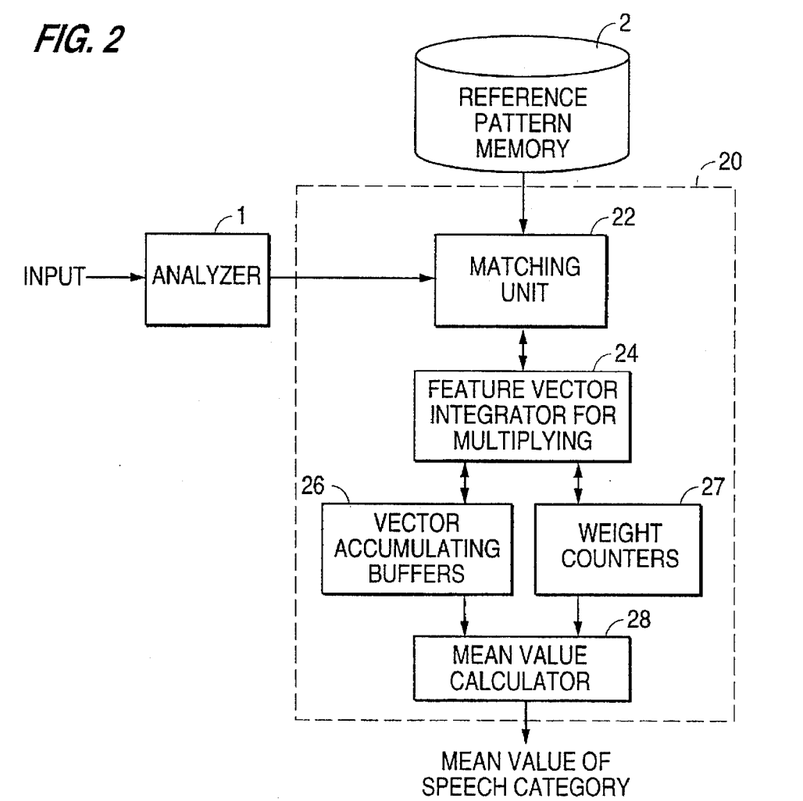
FIG. 2 is a block diagram of an acoustic category mean value calculating apparatus in which input speech is converted into a time sequence of feature vectors by utilizing an input speech feature vector integrator which multiplies the feature vectors of the input speech in a frame by a weight in each acoustic category.

As shown in FIG. 2, an acoustic category mean value calculating apparatus 20 according to a first embodiment of the present invention comprises a matching unit 22 for comparing a time sequence of feature vectors which have been converted from input speech by an analyzer 1 and reference patterns stored in a reference pattern memory 2, i.e., a time sequence of feature vectors that have been converted from training speech sounds and contain added weighting information for each acoustic category, to effect a normalization matching, i.e., a time-alignment between the input speech and the reference patterns, as many input speech feature vector accumulating buffers 26 as the number of acoustic categories in each frame of the time sequence of feature vectors of the reference patterns, for storing an accumulation of weighted feature vectors of the input speech, weight counters 27 for storing weights accumulated in each of the acoustic categories of the feature vectors of the input speech which are stored in the input speech feature vector accumulating buffers 26, an input speech feature vector integrator 24 which, each time the matching unit 22 effects a matching process in a frame at each of the times and makes a transition to a next frame, adds values which have been produced by multiplying the feature vectors of the input speech in the frame by the weight in each of the acoustic categories, to values stored in the frame, from which the transition is made, of the same acoustic category in the input speech feature vector accumulating buffers 26, stores the sums in the frame in the input speech feature vector accumulating buffers 26, adds the weight in each of the acoustic categories in the frame, from which the transition is made, to values stored in the same acoustic category in the frame in the weight counters 27, and stores the sum in the weight counters 27, and a mean value calculator 28 which, after the matching process effected by the matching unit 22 and the accumulating process effected by the input speech feature vector integrator 24, divides values of final frame positions in the respective acoustic categories in the input speech feature vector accumulating buffers 26 by the values in the corresponding weight counters 27, and outputs the quotients as mean values in the acoustic categories of the input speech.

The input speech is converted into a time sequence of feature vectors by the analyzed 1 in the same manner as with the conventional analyzer 1. The feature vectors of the input speech which have been converted by the analyzer 1 are associated in the time domain with the reference patterns stored in the reference pattern memory 2 by a known dynamic time warping matching process such as the DP matching or the HMM matching.

It is assumed that the frames of the input speech and reference patterns, i.e., discrete times, are represented by i (i=1 to I) and j (j=0 to J), respectively, the time sequence of the feature vectors of the input speech is represented by X(i, c), and the time sequence of the feature vectors of the reference patterns is represented by $Y^{(k)}$(j, c), where c is a suffix representing the channel components of the feature vectors and k is a selected template. There are as many feature vector accumulating buffers 26 and as many weight counters 27 as the number of categories p and the number of reference patterns j, and they are represented respectively by $V^p$(j, c), $V_c^p$(j).

The input speech feature vector integrator 24 effects the following processing upon each transition that is carried out for each grid point by the matching unit 22, assuming that a selected template is represented by k' and a selected transition by j':

$$V^p(j, c)=V^p(j', c)+w^p(j)\times(i, c)$$

$$V_c^p(j)=V_c^p(j')+w^p(j)$$

where $w^p$(j) is the weight of a category p, i.e., a quantity indicating how much a frame j belongs to the category p, and is determined in advance with respect to each frame j of a reference pattern. The weight $w^p$(j) is of a large value if the degree to which the frame j belongs to the category p is large, and of a small value if the degree to which the frame j belongs to the category p is small. In the simplest case, it is possible to set the weight $w^p$(j) to 1 for only the category to which the frame j belongs, and set it to 0 for the other categories. In this case, a simple mean value rather than a weighted mean value is determined.

At the time the calculations carried out by the matching unit 22 are finished, i.e., at the time an optimum path from a grid point (0, 0) to a grid point (I, J) is determined, a weighted accumulation and an accumulation of integrated weights in each of the acoustic categories associated along the optimum path are stored in end frame positions (I, J) in the feature vector accumulating buffers 26 and the weight counters 27.

The mean value calculator 28 divides the values stored in the feature vector accumulating buffers 26 assigned to the final frames in the respective acoustic categories of the reference patterns, by the values stored in the corresponding weight counters 27, thereby to determine mean values $V^p$(J, c) in the respective acoustic categories of the input speech.

It is assumed, as with the conventional process, that acoustic categories to be classified comprise two types of templates, i.e., speech and noise, and the weight with respect to each category has a value of 1 or 0 for the sake of brevity, e.g., a category of input speech is identified as being of either speech or noise. It is also assumed that a noise portion of the feature vector accumulating buffers 26 is represented by V(j, c), a speech portion thereof by W(j, c), a noise portion of the weight counters 27 by Vc(j), and a speech portion thereof by Wc(j).

As in the conventional process, the matching unit 22 starts to execute a matching process from a starting point at a grid point (0, 0) of each frame with an accumulated distance D(i, j)=D(0, 0), and progressively executes the matching process in the direction in which the input speech Y(j, c) increases, thereby calculating the accumulated distance, until finally a grid point (I, J) is reached.

Depending on the transition of each grid point X, Y in the matching unit 22, the feature vector integrator 24 operates as follows:

If the feature vectors $Y^{(k)}$(j, c) of the input speech are the template of speech, then the feature vectors X(i, c) of the grid point to which a transition is made are added to the speech portion W(j', c) of the feature vector accumulating buffers 26, and 1 is added to the speech portion Wc(j') of the weight counters 27, as follows:

$$V(j,c)=V(j',c)$$

$$W(j,c)=W(j',c)+X(i,c)$$

$$Vc(j)=Vc(j')$$

$$Wc(j)=Wc(j')+1.$$

If the feature vectors $Y^{(k')}$(j, c) of the input speech are the template of noise, then the feature vectors X(i, c) of the grid point to which a transition is made are added to the noise portion V(j', c) of the feature vector accumulating buffers 26, and 1 is added to the noise portion Vc(j') of the weight counters 27, as follows:

$$V(j,c)=V(j',c)+X(i,c)$$

$$W(j,c)=W(j',c)$$

$$Vc(j)=Vc(j')+1$$

$$Wc(j)=Wc(j').$$

When the matching process effected by the matching unit 22 reaches the grid point (I, J) and hence an optimum path from the grid point (0, 0) is determined, an accumulated value of the feature vectors and an accumulated value of weights in each of the acoustic categories associated along the optimum path are determined in the feature vector accumulating buffer 26 and the weight counter 27 that correspond to the final grid point (I, J).

Therefore, when the matching process effected by the matching unit 22 is finished, the mean value calculator 28 divides the value of the feature vector accumulating buffer 26 corresponding to the final grid point (I, J) by the value of the weight counter 27 thereby to determine a mean value in each acoustic category of the input speech, i.e., a mean value V(J, c) of the noise portion of the input speech and a mean value W(J, c) of the speech portion thereof.

If the number of acoustic categories to be classified is small, then the memory size may be smaller than that of the conventional apparatus. For example, for a general scale in which the number of acoustic categories to be classified is 2, the length of reference patterns is 100, the length of input speech is 200, and the number of dimensions of feature vectors is 20, the conventional apparatus has required a memory size of 100×200×2=40,000 for storing backtracking and template information, whereas the apparatus according to the present invention requires a memory size of only 100×2×20+100×2=4,200 for storing backtracking and template information. Therefore, since the memory size of the acoustic category mean value calculating apparatus according to the present invention is about 1/10 of that of the conventional apparatus, the cost of the acoustic category mean value calculating apparatus according to the present invention may be lower than that of the conventional apparatus.

Figure 3:
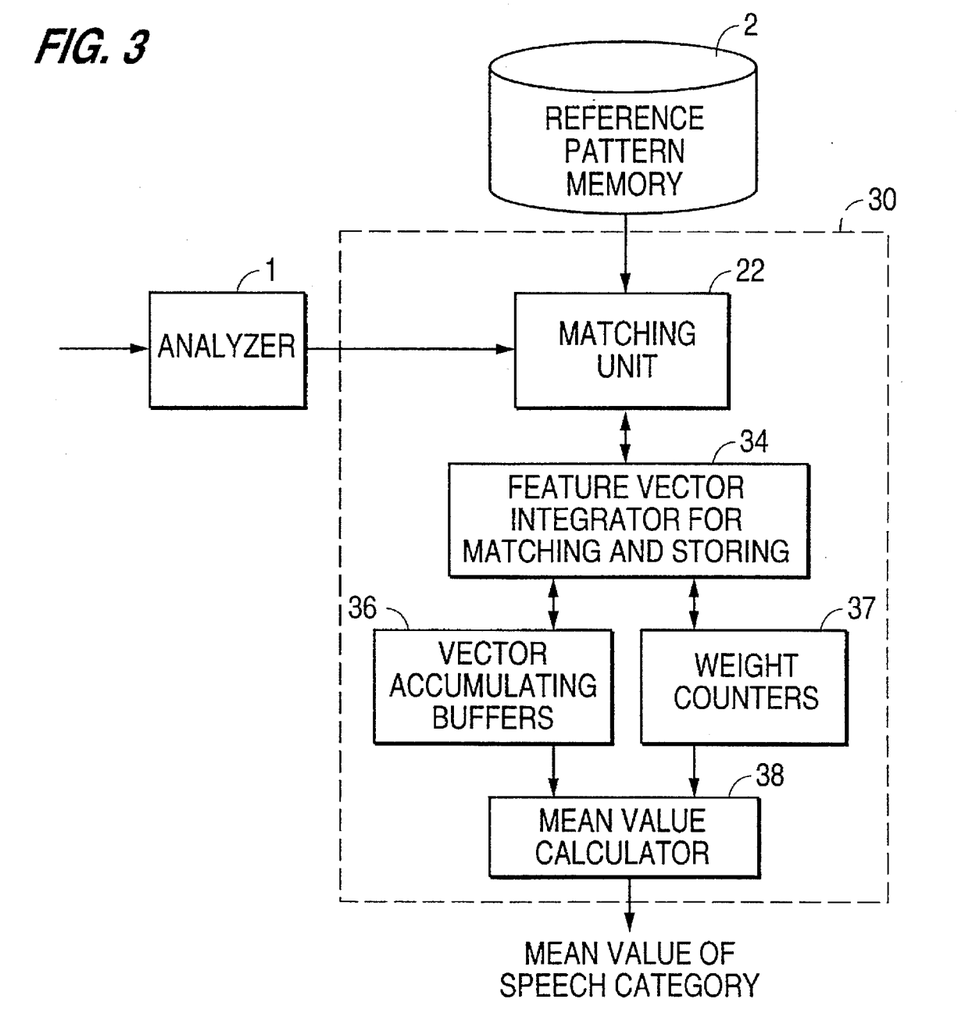
FIG. 3 is a block diagram of an acoustic category mean value calculating apparatus in which input speech is converted into a time sequence of feature vectors by utilizing an input speech feature vector integrator which matches reference patterns with input speech, and which integrates and stores weighted feature vectors and weights of the reference patterns.

FIG. 3 shows an acoustic category mean value calculating apparatus 30 according to a second embodiment of the present invention. As shown in FIG. 3, the acoustic category mean value calculating apparatus 30 comprises a matching unit 22 which is identical to the matching unit 22 of the acoustic category mean value calculating apparatus 20 according to the first embodiment shown in FIG. 2, a feature vector integrator 34, feature vector accumulating buffers 36, weight counters 37, and a mean value calculator 38. While the feature vector integrator 24 of the acoustic category mean value calculating apparatus 20 according to the first embodiment integrates the feature vectors of input speech in the feature vector accumulating buffers 26 and the weight counters 27, the feature vector integrator 34 differs therefrom in that it matches reference patterns stored in the reference pattern memory 2 with input speech, and integrates and stores weighted feature vectors and weights of the reference patterns in the feature vector accumulating buffers 36 and the weight counters 37, and the mean value calculator 38 outputs a mean value of the reference patterns.

Therefore, the arrangements and operation of the parts of the acoustic category mean value calculating apparatus 30 are substantially the same as those of the acoustic category mean value calculating apparatus 20 according to the first embodiment.

It is assumed that the time sequence of feature vectors of input speech is represented by X(i, c), and the time sequence of feature vectors of reference patterns is represented by $Y^{(k)}(j, c)$ where i, j represent frames (discrete times), respectively of the input speech and the reference patterns, c is a suffix representing the channel components of the feature vectors, and k is a selected template. There are as many feature vector accumulating buffers 36 as the number of reference patterns j of categories p, and they are represented by $W^p(j, c)$. Similarly, the weight counters 37 are represented by $W_c^p(j)$.

The feature vector integrator 34 effects the following processing upon each transition that is carried out for each grid point by the matching unit 22, assuming that a selected template is represented by k', a selected transition by j', and the weight of a category determined in advance for each frame j of the reference patterns is represented by $w^p(j)$:

$$W^p(j, c) = W^p(j', c) + w^p(j)Y^{(k')}(j, c)$$

$$W_c^p(j) = W_c^p(j') + w^p(j)$$

When the matching process effected by the matching unit 22 reaches the grid point (I, J) and hence an optimum path from the grid point (0, 0) is determined, an accumulated value of the feature vectors and an accumulated value of weights in each of the acoustic categories associated along the optimum path are determined in the feature vector accumulating buffer 36 and the weight counter 37 that correspond to the final grid point (I, J).

Therefore, when the matching process effected by the matching unit 22 is finished, the mean value calculator 38 divides the value of the feature vector accumulating buffer 26 corresponding to the final grid point (I, J) by the value of the weight counter 27 thereby to determine a mean value $W^p(j, c)$ in each acoustic category of the reference patterns.

According to the second embodiment, after the reference patterns have been nonlinearly processed in the same manner as with the input speech, a mean value in each category of the reference patterns can be determined. Therefore, the accuracy with which the mean value is estimated is improved, and so is the performance of the acoustic category mean value calculating apparatus 30.

Figure 4:
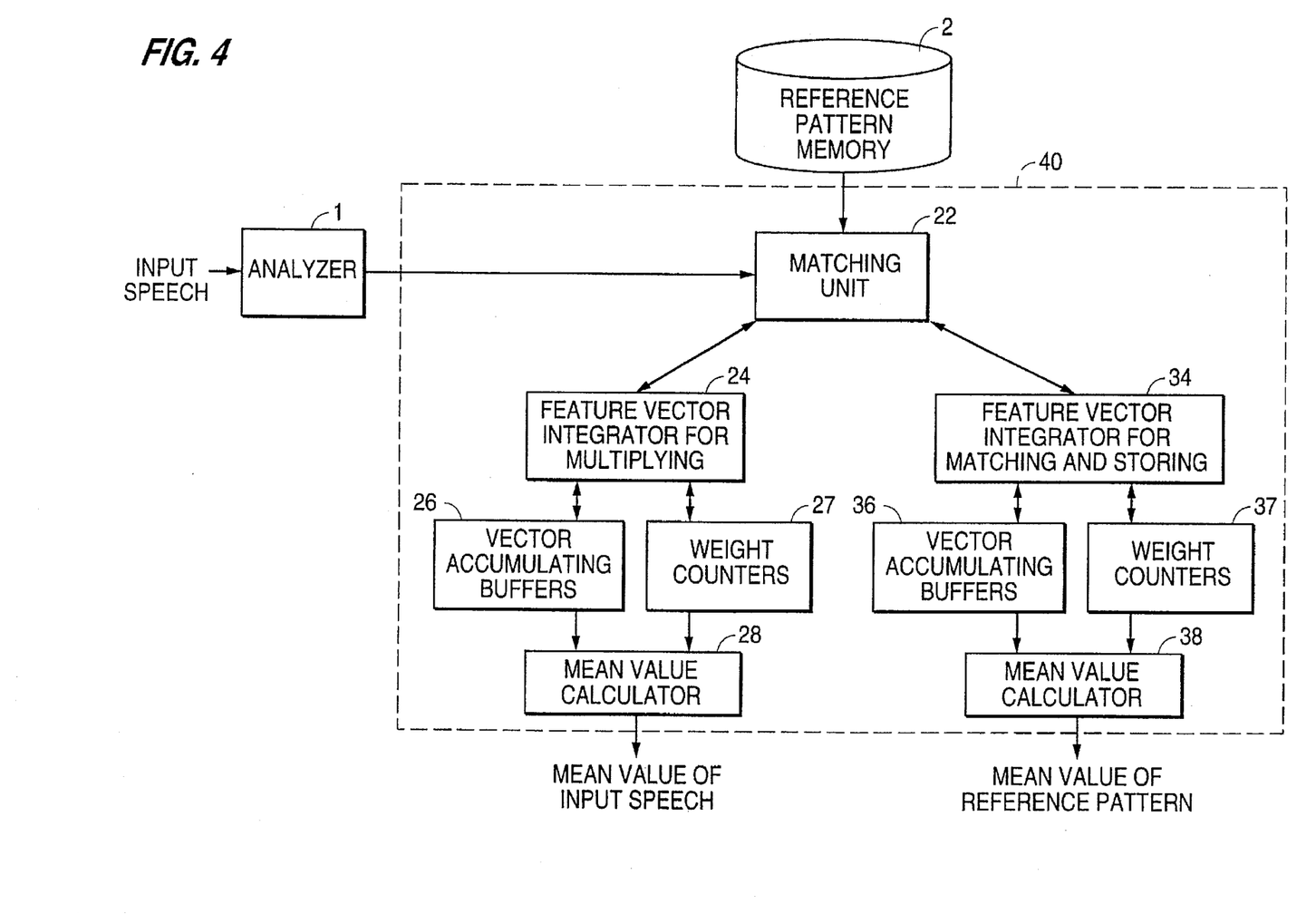
FIG. 4 is a block diagram of an acoustic category mean value calculating apparatus in which input speech is converted into a time sequence of feature vectors by utilizing two input speech feature vector integrators.

FIG. 4 shows an acoustic category mean value calculating apparatus 40 according to a third embodiment of the present invention. As shown in FIG. 4, the acoustic category mean value calculating apparatus 40 comprises an acoustic category mean value calculating section which is identical to the acoustic category mean value calculating apparatus 20 according to the first embodiment and an acoustic category mean value calculating section which is identical to the acoustic category mean value calculating apparatus 30 according to the second embodiment, these acoustic category mean value calculating sections being coupled to each other in one apparatus. When the matching process carried out by the matching unit 22 is completed, the acoustic category mean value calculating apparatus 40 can calculate mean values in acoustic categories of both the input speech and the reference patterns simultaneously with each other.

According to the third embodiment, it is possible to adapt both the input speech and the reference patterns in order to determine mean values in acoustic categories of both the input speech and the reference patterns after the degrees of nonlinear expansion and contraction of both the input speech and the reference patterns have been equalized. The acoustic category mean value calculating apparatus 40 is therefore higher in performance.

Figure 5:
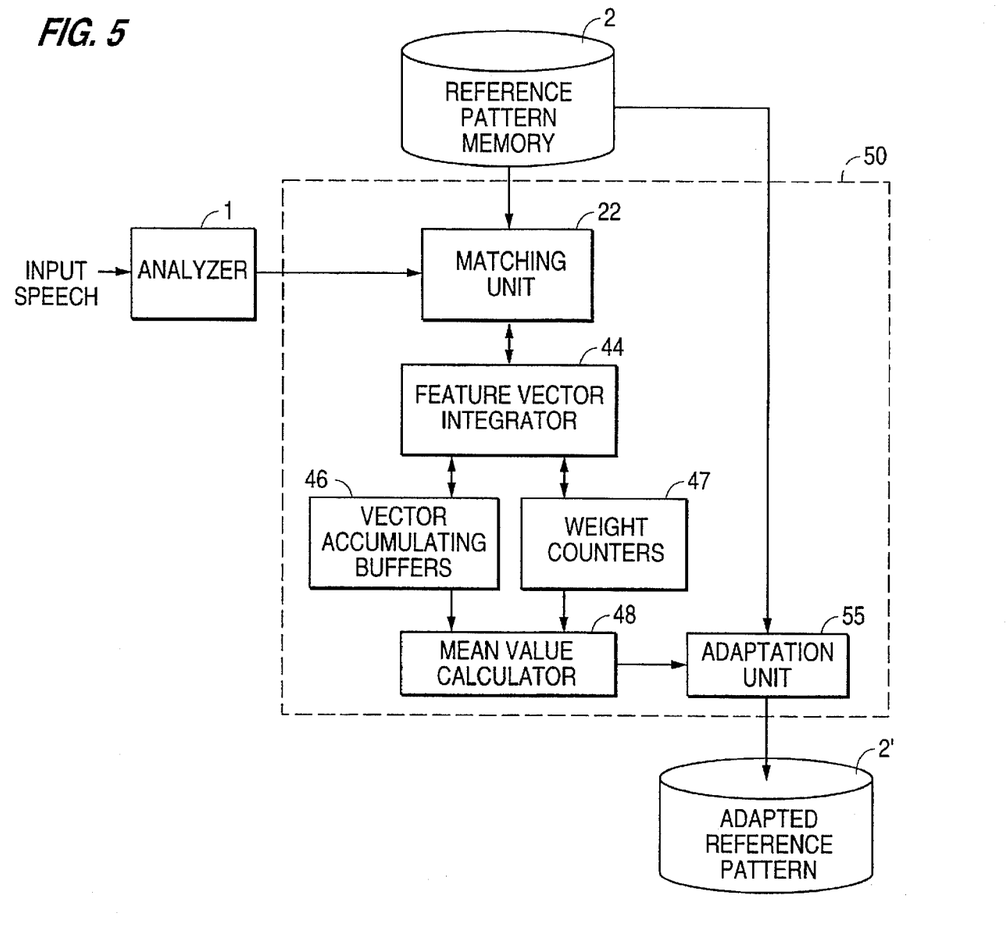
FIG. 5 is a block diagram of an adaptation apparatus in which input speech is converted into a time sequence of feature vectors by utilizing an input speech feature vector integrator, and which includes an adaptation unit.

FIG. 5 shows an acoustic category mean value calculating apparatus 50 according to a fourth embodiment of the present invention. As shown in FIG. 5, the acoustic category mean value calculating apparatus 50 comprises an acoustic category mean value calculating apparatus which is identical to the acoustic category mean value calculating apparatus 20 according to the first embodiment and an adaptation unit 55 connected to the acoustic category mean value calculating apparatus. Using mean values in the respective categories of input speech which have been calculated by the acoustic category mean value calculating apparatus, the reference patterns stored in the reference pattern memory 2 are adapted to generate new reference patterns.

Operation of the acoustic category mean value calculating apparatus 50 according to the fourth embodiment which is arranged to effect speaker adaptation in the same manner as with the literature 1 referred to above will be described below.

An adaptation vector $\Delta j$ of acoustic categories is determined from a mean value $[\mu_j]$ with respect to acoustic categories j of input speech which is calculated by the acoustic category mean value calculating apparatus and a predetermined mean value $\mu_j$ with respect to acoustic categories j of reference patterns, as follows:

$$\Delta_j = [\mu_j] - \mu_j$$

With respect to acoustic categories i of reference patterns for input speech with no acoustic categories present therein, its adaptation vector $\Delta i$ is determined from acoustic categories j of reference patterns for input speech with acoustic categories present therein, using the same spectral interpolation as with the above literature 1, as follows:

$$\Delta_i = \sum_j w_{ij} \Delta_j$$

Using these adaptation vectors, the adaptation unit 55 carries out adaptation by establishing:

$$\hat{\mu}_k = \mu_k + \Delta$$

with respect to all the reference patterns k belonging to the acoustic categories i, j, where $\Delta$ is either $\Delta i$ or $\Delta j$ selected depending on the type of k.

When a mean value I(p, c) with respect to acoustic categories p has been determined, i.e., a mean value M(p, c)

with respect to acoustic categories p of reference patterns has been determined in advance, an adaptation vector Δ(p, c) in each of the acoustic categories is determined by:

$$\Delta(p, c) = I(p, c) - M(p, c).$$

The adaptation unit 55 adds this adaptation vector in each of the acoustic categories of the reference patterns to adapt the reference patterns for thereby generating new reference patterns.

While the adaptation vector is used as it is to adapt the reference patterns in the above example, a suitable coefficient Δ may be used to establish the following equation:

$$\hat{\mu}_k = ((1+\alpha)\mu_k + \Delta)/(1+\alpha)$$

to control the degree of adaptation for preventing unduly large adaptation.

The acoustic category mean value calculating apparatus 50 according to the fourth embodiment may be composed of a combination of the adaptation unit 55 and either the acoustic category mean value calculating apparatus 20 or the acoustic category mean value calculating apparatus 30.

The combination of the adaptation unit 55 and the acoustic category mean value calculating apparatus 30 for extracting environmental differences, i.e., difference in channel distortion and difference in additive noise in the spectral domain, between a reference pattern and a short utterance to be recognized, and adapting the reference patterns to a new environment using the differences, will be described below.

Experimental results obtained using conventional speech recognition apparatus have been reported by Takagi, et al. See Takagi, Hattori, and Watanabe, "Speech Recognition with Environment Adaptation by Spectrum Equalization, Spring Meeting of the Acoustical Society of Japan, 2-P-8, pp. 173–174, March, 1994.

It is assumed that acoustic categories to be classified are speech and noise. A mean spectrum Sw of a speech model of reference patterns, a mean spectrum Nw of a noise model of reference patterns, a mean spectrum Sv of a speech portion of input speech, and a mean spectrum Nv of a noise portion of the input speech are obtained by an acoustic category mean value calculating apparatus.

A speech model of reference patterns W(t) is adapted by:

$$[W(t)] = ((Sv-Nv)/(Sw-Nw)) \times (W(t)-(Nw)) + Nv$$

and a noise model of reference patterns is adapted by:

$$[W(t)] = Nv$$

The present invention is also applicable to any adaptation or training apparatus which uses a mean value in each acoustic category, other than the above apparatus.

It is to be understood that variations and modifications of the acoustic category mean value calculating apparatus and the adaptation apparatus disclosed herein will be evident to those skilled in the art. It is intended that all such modifications and variations be included within the scope of the appended claims.

What is claimed is:

1. An apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain weighting information for each acoustic category, to effect a time-alignment in each frame, for thereby calculating a mean value in each of the acoustic categories, said apparatus comprising:

as many feature vector accumulating buffers as the number of acoustic categories in each frame of the reference patterns, for storing an accumulated value of weighted feature vectors in the acoustic categories;

as many weight counters as the number of acoustic categories in each frame of the reference patterns, for storing an accumulated value of weights of feature vectors added in the acoustic categories in each frame;

a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters; and a mean value calculator for dividing accumulated values of weighted feature vectors in final frames of the matching in the respective acoustic categories stored in said feature vector accumulating buffers by the accumulated values of weights in the acoustic categories stored in said weight counters, and outputting the quotients as mean values in the acoustic categories of the feature vectors of the input speech to be calculated.

2. An apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain weighting information for each acoustic category, to effect a time-alignment in each frame, for thereby calculating a mean value in each of the acoustic categories, said apparatus comprising:

two acoustic category mean value calculating sections each comprising:

as many feature vector accumulating buffers as the number of acoustic categories in each frame of the reference patterns, for storing an accumulated value of weighted feature vectors in the acoustic categories;

as many weight counters as the number of acoustic categories in each frame of the reference patterns, for storing an accumulated value of weights of feature vectors added in the acoustic categories in each frame;

a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters; and a mean value calculator for dividing accumulated values of weighted feature vectors in final frames of the matching in the respective acoustic categories stored in said feature vector accumulating buffers by the accumulated values of weights in the acoustic categories stored in sail weight counters, and outputting the quotients as mean values in the acoustic categories of the feature vectors of the input speech to be calculated.

3. An apparatus for calculating a mean value in each acoustic category by matching, with a matching unit, a time sequence of feature vectors which have been converted from input speech by an analyzer and reference patterns stored in a reference pattern memory and composed of a time sequence of feature vectors that have been converted from training speech sounds and contain weighting information for each acoustic category, to effect a time-alignment in each frame, for thereby calculating a mean value in each of the acoustic categories, and for adapting at least one of the input speech and the reference patterns using the mean value in each of the acoustic categories, said apparatus comprising:

two acoustic category mean value calculating sections each comprising:

as many feature vector accumulating buffers as the number of acoustic categories in each frame of the reference patterns, for storing an accumulated value of weighted feature vectors in the acoustic categories;

as many weight counters as the number of acoustic categories in each frame of the reference patterns, for storing an accumulated value of weights of feature vectors added in the acoustic categories in each frame;

a feature vector integrator which, each time the matching unit effects a matching process in each frame, adds values which have been produced by multiplying the feature vectors of the input speech to be calculated in the frame by the weight in each of the acoustic categories, to values stored in the frame, from which a transition is made and which has been subjected to matching immediately before, in the feature vector accumulating buffers, stores the sums in the frame in the feature vector accumulating buffers, adds the weight in each of the acoustic categories in the frame, from which the transition is made, to values stored in the same acoustic category in the frame in the weight counters, and stores the sum in the weight counters; and a mean value calculator for dividing accumulated values of weighted feature vectors in final frames of the matching in the respective acoustic categories stored in said feature vector accumulating buffers by the accumulated values of weights in the acoustic categories stored in said weight counters, and outputting the quotients as mean values in the acoustic categories of the feature vectors of the input speech to be calculated.

4. A method of calculating a mean value in each acoustic category by matching a time sequence of feature vectors which have been converted from input speech and reference patterns composed of a time sequence of feature vectors that have been converted from training speech sounds and containing added weighting information for each acoustic category, to effect a time-alignment in each frame, for thereby calculating a mean value in each of the acoustic categories, said method comprising the steps of:

each time the input speech is matched with the reference patterns successively from a first frame of the reference patterns and a transition is made to a next frame, integrating values which have been produced by multiplying the feature vectors of the input speech to be calculated in the frame in which the input speech is matched with the reference patterns, by the weight in each of the acoustic categories in the frame, and holding the integrated values in each frame;

integrating weights in the respective acoustic categories in the frame in which the input speech is matched with the reference patterns, and holding the integrated weights in each frame;

after the input speech is matched with the reference patterns in a final frame, dividing a weighted accumulated value of the feature vectors in each of the acoustic categories in the final frame, by a weighted accumulated value of weights in the corresponding acoustic categories in the frame; and outputting a quotient as a mean value in each of the acoustic categories.

5. A method according to claim 4, wherein an accumulation of weighted feature vectors in each of the acoustic categories with respect to the feature vectors extracted from the input speech, and an accumulated value of weights thereof are calculated to output a mean value in each of the acoustic categories of the feature vectors of the input speech.

6. A method according to claim 4, wherein an accumulation of weighted feature vectors in each of the acoustic categories with respect to the feature vectors of the reference patterns, and an accumulated value of weights thereof are calculated to output a mean value in each of the acoustic categories of the feature vectors of the reference patterns.

7. A method according to claim 4, wherein an accumulation of weighted feature vectors in each of the acoustic categories with respect to the feature vectors extracted from the input speech and the feature vectors of the reference patterns, and an accumulated value of weights thereof are calculated to output mean values in each of the acoustic categories of the feature vectors of the input speech and the reference patterns simultaneously with each other.

* * * * *